United States Patent [19]

Adams et al.

[11] Patent Number: 4,506,852
[45] Date of Patent: Mar. 26, 1985

[54] PAYLOAD DEPLOYMENT FROM LAUNCH VEHICLE USING CANTED SPRINGS FOR IMPARTING ANGULAR AND LINEAR VELOCITIES

[75] Inventors: Gerald J. Adams, Rancho Palos Verdes; William L. Burkett, Jr., Redondo Beach; John V. Smolik, Granada Hills, all of Calif.

[73] Assignee: Hughes Aircraft Company, El Segundo, Calif.

[21] Appl. No.: 379,536

[22] Filed: May 18, 1982

Related U.S. Application Data

[63] Continuation of Ser. No. 131,309, Mar. 18, 1980, abandoned.

[51] Int. Cl.³ ............................................. B64G 1/64
[52] U.S. Cl. ............................. 244/158 R; 244/161; 244/137 R; 89/1.57; 124/16
[58] Field of Search .............. 244/158 R, 159, 160, 244/161, 165, 137 R, 172, 63; 89/1.5 F, 1.5 R, 1 B; 102/357, 351; 46/74 B, 69, 145; 124/16, 14 R, 81

[56] References Cited

U.S. PATENT DOCUMENTS

| 2,946,151 | 7/1960 | Traylor et al. | 46/74 B |
| 3,191,342 | 6/1965 | Chalmers | 46/74 B |
| 3,380,687 | 4/1968 | Wrench et al. | 244/158 R |
| 3,420,470 | 1/1969 | Meyer | 244/158 R |
| 3,760,730 | 9/1973 | Osborn et al. | 244/158 R |
| 3,949,518 | 4/1976 | Lenza | 46/74 B |
| 4,015,507 | 4/1977 | Toy et al. | 89/1.5 F |
| 4,067,308 | 1/1978 | Anderson et al. | 46/74 B |
| 4,181,062 | 1/1980 | Bernstein et al. | 89/1.5 F |

OTHER PUBLICATIONS

Wheelon, "The Impact of Space Shuttle on the Future of Communication Sat." 5CG86624V, Nov. 9, 1978.

*Primary Examiner*—Galen L. Barefoot
*Attorney, Agent, or Firm*—E. F. Oberheim; A. W. Karambelas

[57] ABSTRACT

An apparatus for launching a payload, such as a spacecraft or satellite, from a launch vehicle in which a single instrumentality is employed to simultaneously impart angular momentum about the center of mass of the payload and linear momentum in a direction along the axis of rotation.

11 Claims, 7 Drawing Figures

PAYLOAD DEPLOYMENT FROM LAUNCH VEHICLE USING CANTED SPRINGS FOR IMPARTING ANGULAR AND LINEAR VELOCITIES

The Government of the United States of America has rights in this invention pursuant to Contract No. F04701-76-C-0093 awarded by the Department of the Air Force.

This application is a continuation of application Ser. No. 131,309, filed Mar. 18, 1980, entitled "Payload Deployment from Launch Vehicle Using Canted Springs for Imparting Angular and Linear Velocities", Gerald G. Adams et al, now abandoned.

BACKGROUND OF THE INVENTION

1. Field of Invention

This invention relates generally to arrangements for launching payloads, such as spacecraft or satellites from launch vehicles and, more particularly, to launching arrangements in which the payload is gyroscopically stabilized by spinning at the time it is launched or ejected from the launch vehicle.

2. Description of the Prior Art

Some prior art arrangements, such as that of U.S. Pat. No. 3,380,687; E. H. Wrench et al, employ a satellite carrier described by Wrench et al as a dispenser in which separate instrumentalities are employed to impart angular and linear momentum to the satellite to be launched. Wrench et al employ a motor to spin the dispenser and springs to apply force longitudinally of the dispenser to separate the spinning dispenser from the booster.

Other prior art arrangements impart angular momentum and linear momentum in which the linear momentum is in a direction transverse to the rotation axis. U.S. Pat. No. 3,672,605 Leonard Hoffman et al, extends a ramp from the side of an accelerating ballistic missile down which the payload rolls to pass from the missile in response to that component of the accelerating force acting parallel to the ramp.

Still other prior art arrangements have employed springs to achieve payload separation from a launch vehicle to provide linear, but not angular, velocity to the deployed payload.

Arrangements such as that of Hoffman et al are limited as to the type of vehicle from which the payload may be launched, while arrangements employing separate instrumentalities for imparting angular and linear momentum to the payload add weight and the separate spin mechanism usually requires power from limited capacity energy sources. Spring arrangements providing linear velocity alone are not safely employed where payload launching from a close fitting payload bay is necessary. Moreover, payload stabilization and orientation now necessitate the expenditure of energy carried by the payload.

SUMMARY OF THE INVENTION

This invention provides a payload deployment or launching arrangement which is not launch vehicle limited in the sense that it may be used to launch payloads from either expendable or reusable launch vehicles, the latter, such as the space shuttle. Additionally, weight and energy requirements are minimized in an arrangement using a single instrumentality for simultaneously imparting both linear and angular momentum to the payload at the time of deployment. This single instrumentality is a spring arrangement comprising two or more canted springs compressed between launch vehicle structure and payload structure. The payload is releasably secured to the launch vehicle. Release is achieved in a manner obviating unbalanced or delayed release at any attachment point to avoid tilting of the payload. Similarly, spring matching techniques among the plurality of canted springs minimizes payload tilting due to unbalanced spring forces, while angular momentum resulting from the spin imparted to the payload as the canted springs extend, stabilizes the payload during and after the spring thrust interval.

An object of this invention is to provide a payload deployment apparatus employing a single instrumentality for simultaneously imparting linear and angular velocity to a payload.

Another object of this invention is to provide a payload deployment launching apparatus of the character referred to in the preceding object, in which the launching energy is stored in said single instrumentality requiring no external energy supply.

Spinning the payload at the time it is launched affords the additional advantage in the elimination of the need for bladders, reservoirs, or complex spinup sequences after launch required, in system using liquid propellant, in order to ensure propellant feed at the thrustors employed in spacecraft for attitude control, transfer orbit propulsion and so on.

Other objects and advantages will become apparent from a study of the following specification when considered in conjunction with the accompanying drawings, in which.

Figure 1:
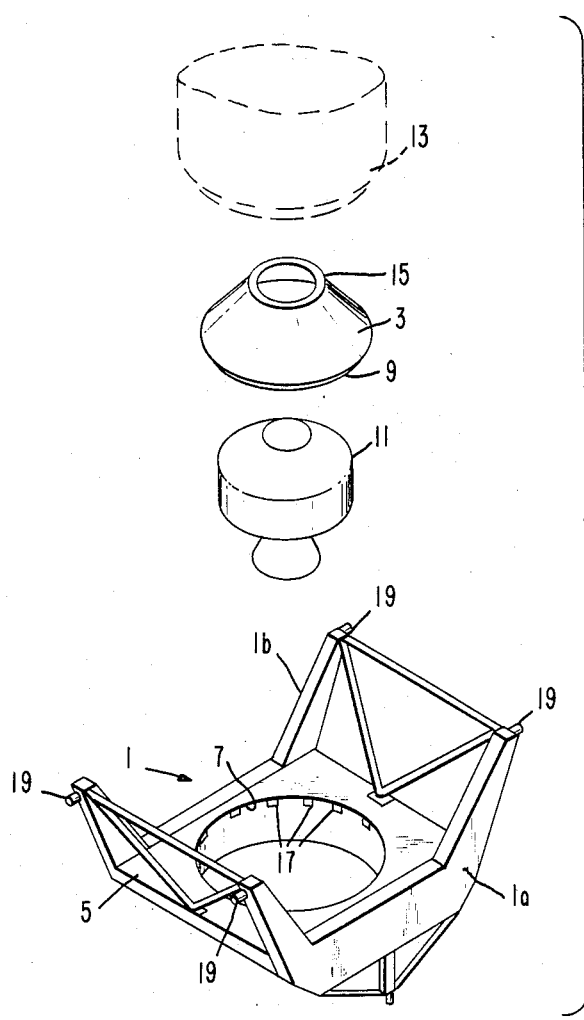
FIG. 1 is an exploded view of a space shuttle payload ejection or launching module embodying the principles of this invention.
Figure 2:
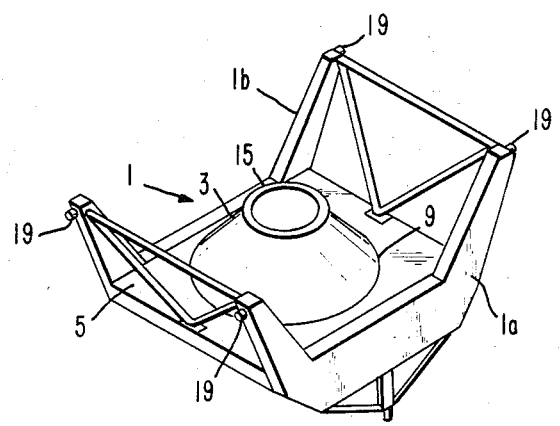
FIG. 2 is an assembled view of the arrangement of FIG. 1.

Referring to FIGS. 1 and 2, the space shuttle payload ejection or launching module comprises a cradle 1 and an adapter 3 which, as will be seen by reference to FIG. 2, seats upon a platform 5 forming the base of the cradle 1. To this end the cradle is provided with a circular opening through the platform 5 as seen in FIG. 1. A separation ring 7 surrounds this circular opening. A corresponding ring 9 is disposed at the bottom of the adapter 3 and has a complementary face which engages the upper face of the separation ring 7. The assembled payload includes a perigee kick motor 11, which fits within the bottom opening of the conical adapter 3 and a spacecraft 13 which seats upon a circular separation ring 15 at the top side of the adapter as seen in FIG. 1. In the interest of simplicity, only the adapter 3 is shown assembled to the cradle in FIG. 2.

A plurality of springs 17 are uniformly circumferentially positioned upon suitable supports (not shown) within the circular opening in the cradle platform 5. These springs, in compressed position between the cradle platform 5 and the adapter 3, are canted or tilted from the perpendicular circumferentially in the same sense to provide two components of spring force at the individual spring locations acting upon the spacecraft adapter assembly. One component is a thrust component acting parallel to the axis about which the spacecraft 13 will spin and the other is a tangential component for imparting angular velocity to the spacecraft.

Figure 5:
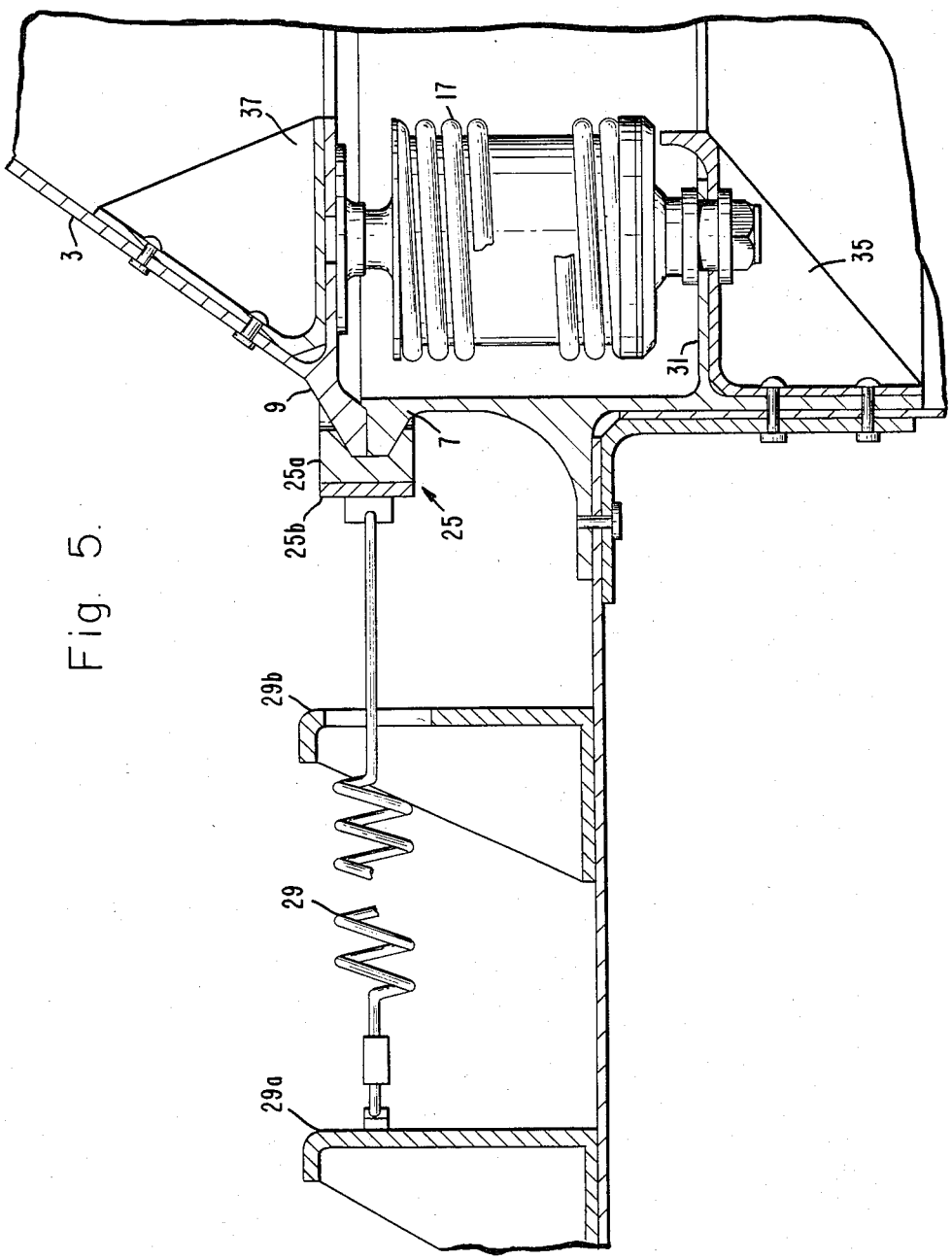
FIGS. 5, 6 and 7 are enlarged detailed views of one spring of the spring launching mechanism.

In assembled relationship clamps are provided at the separation planes between the adapter and the cradle and the adapter and the spacecraft releasably securing the adapter to the cradle and releasably securing the adapter to the spacecraft. These clamps appear in FIG. 3 which is drawn to a somewhat larger scale. The clamp between the adapter and the cradle being shown in further enlarged detail in FIG. 5.

Figure 3:
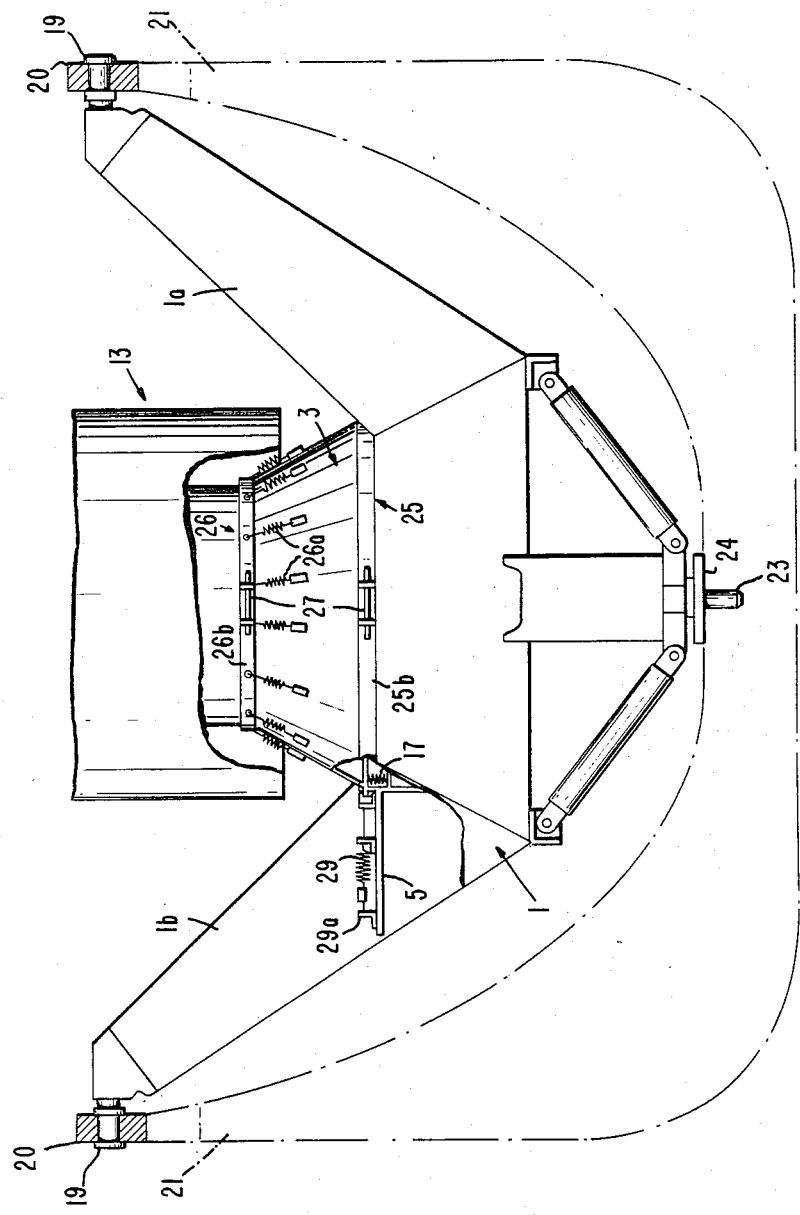
FIG. 3 is an elevation view fragmentarily in section illustrating additional details of the space shuttle payload ejection or launching module.
Figure 4:
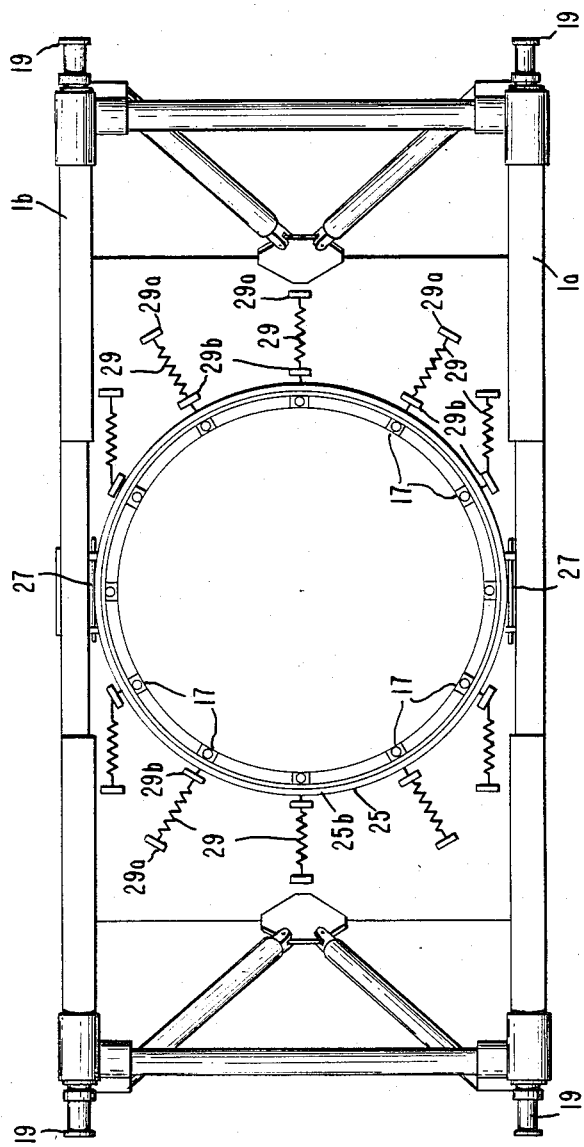
FIG. 4 is a plan view of FIG. 3 with the payload removed.

Referring particularly to FIGS. 3 and 4, the cradle 1 comprises a left beam 1a and a right beam 1b. These have upwardly and outwardly extending arms terminating in respective trunnion fittings 19 at the upper ends. These trunnion fittings are mounted in respective split clamps 20, carried on the longerons 21 along the sides of the shuttle bay. The approximate cross section of the bottom portion of the fuselage of the shuttle at the cradle location is indicated in dot-dash outline in FIG. 3. The interior cross section of the shuttle fuselage at this location defining the shuttle bay is semicircular in cross section. The upper portion of the shuttle at this location is not illustrated. The primary cradle load is coupled into the space shuttle at the four trunnions 19 along the longerons 21. A fifth trunnion 23 at the bottom of the cradle engaging the keel 24 of the shuttle may be employed to provide additional stability.

Clamping rings 25 and 26 engage the seated separation rings at the respective separation planes. A typical cross section of both clamping rings is seen in the cross section of clamping ring 25 in FIG. 5. Here the clamping ring comprises individual clamping shoes 25a (only one being shown) straddling the seated separation rings 7 and 9. The individual clamping shoes or bars 25a are encompassed by a segmented band 25b. The segmented 25b comprises four band sections, see FIGS. 3 and 4, which are bolted together and tensioned by explosive bolts 27, one of which is shown in FIG. 3. Clamping ring 26 comprises two band sections also joined by explosive bolts 27. Individual tension springs 29 coupled between respective brackets 29a and the sections of the clamping ring 25 (see FIG. 4) withdraw the clamping ring sections from the seated separation rings to a position against the bumper brackets 29b, in which position the clamping shoes or bars 25a are clear of the separation rings. In achieving this operation, the explosive bolts 27 are simultaneously fired and the clamping ring sections are simultaneously withdrawn, simultaneously freeing all portions of the seated separation rings.

Figure 6:
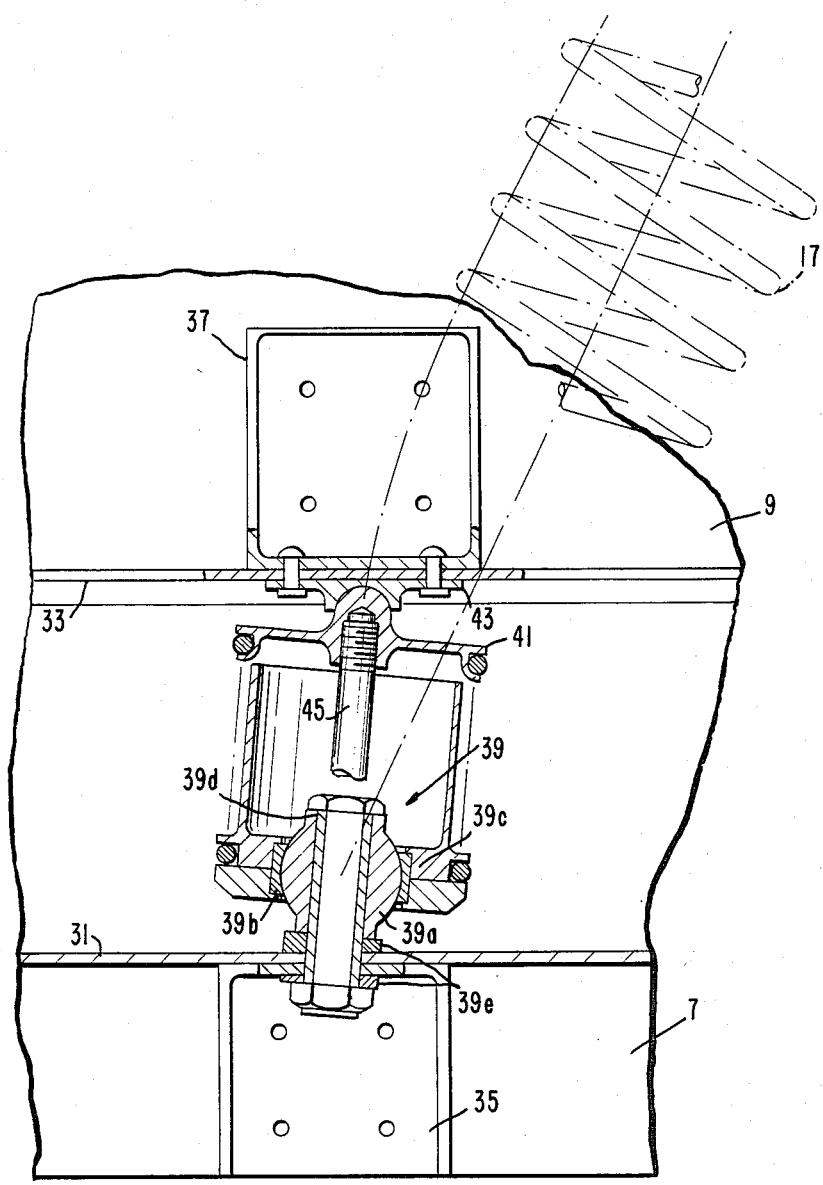

The compression springs 17 are disposed between the confronting inwardly flanged portions 31 and 33 of the respective seated separating rings 7 and 9, which are stiffened by respective brackets 35 and 37 at the spring seats on the flanges. As will be seen by reference to FIG. 6, spring 17 is tilted or canted circumferentially between the flanges. As will be seen in FIG. 4, twelve compression springs are provided in uniformly spaced circumferential positions. All of these springs are uniformly tilted in the same direction to provide tangential components of compression spring force which are additive around the spring circle. With respect to FIG. 6, the first angle of tilt or cant of the individual springs in compressed condition, according to one embodiment of this invention, is 5 degrees. The second or final angle of spring tilt or cant increasing to 25 degrees when the spring is fully extended. In view of the character of the spring motion, it is necessary that the individual springs be supported at both ends to provide 2 degrees of angular freedom for the plane of the spring seat and to permit rotation of the spring seats relative to the confronting flanges 31 and 33, i.e., about the spring axis. This freedom is achieved at the fixed end or base of the spring in the provision of a self-aligning bearing 39 comprising a ball 39a and socket structure 39b supporting a separation spring seat and guide 39c, which secures the spring to the self-aligning bearing. A hollow bolt 39d secures the ball structure 39a to the flange 31. Tapered washers 39e provide the desired degree of tilt or cant to the self-aligning bearing.

The free end of the spring 17 is captured in a spring end cap 41 having a hemispherical center section fitting within a complementary socket on a spring end cap seat 43, secured to the flange 33, which forms part of the adapter.

As part of the ground support equipment only, and for the purpose of compressing the individual springs, a spring precompression rod 45 extending through the hollow bolt 39d, but only fragmentarily shown in this view, is used to compress the individual springs to permit seating of the adapter separation ring 9 on the cradle separation ring 7. After the clamping ring 25 is secured, the spring pre-compression rods 45 are removed.

Figure 7:
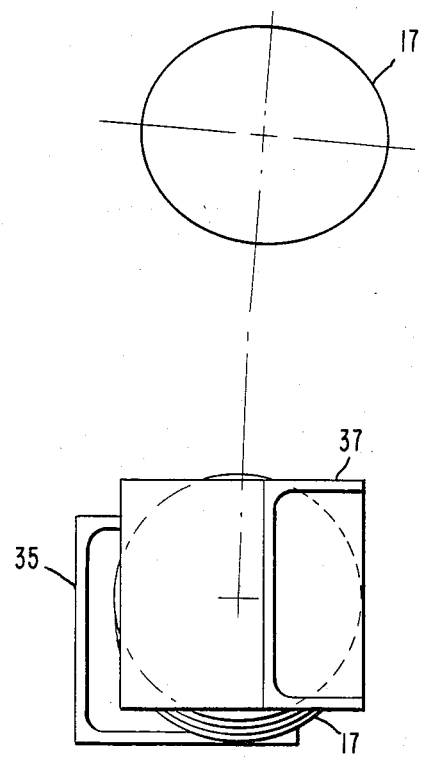

When the explosive bolts are fired releasing the adapter from the cradle, the compression springs 17 begin to extend. Incremental points of the center of the hemispherical section of the spring end cap 41 are plotted in FIG. 6 to the point of full spring extension. In fully extended position, the spring tilt or cant angle projected into the tangential plane is approximately 25 degrees. As will be seen in FIG. 7, depicting this spring assembly as viewed from the top side, the center of the free end of the spring, as it extends, tracks an arc of a circle determined by the radius of the spring end cap seat 43. To simplify the illustration in FIG. 7, only the spring seat brackets 35 and 37 are illustrated.

From this, it is apparent that the springs are installed so that in their fully extended condition they make an angle with the axis of payload rotation in the tangential direction of the rotation. In the compressed condition they make an angle in the same sense, so that during release the springs exert a tangential force on the body causing rotating of the body at the same time that a force is exerted along the body spin axis causing linear velocity to separate the body from the launch vehicle. The mounting of the springs is such that the springs are permitted to rotate during extension, so that the springs can be at any convenient radius from the body rotation axis, otherwise they would have to be located at the radius of gyration of the body. After the springs have reached their fully extended positions, the body simply lifts off the points of contact with the springs, while simultaneously rotating. Separation velocity and rotational speed depend on the number of springs, the spring cant angles, the radial distance of the springs from the spring axis, the spring stiffness and the spring compression. The attitude precision upon payload release from the launch vehicle depends on launch vehicle stability, structural rigidity of the spring support elements, ejection vector force alignment and liquid fuel motion. Optimal choice of these parameters, which is not part of this invention, ensures precise satellite deployment.

In the embodiment of the invention herein described, it is intended that the spacecraft and the adapter shall remain engaged during the deployment or launching operation. In shuttle-type payload launches, the shuttle attitude is adjusted so that the payload is launched with the thrust axis of the perigee kick motor 11 tangential to the transfer orbit at that point. Firing of the perigee kick motor is delayed until the spacecraft and shuttle are sufficiently separated, that the shuttle is out of range of the perigee kick motor blast.

This inention may be practiced with either spin stabilized or three-axis stabilized spacecraft. In spin stabilized applications, the spacecraft after deployment is brought up to operational spin speed using the spacecraft spin jets. After the perigee kick motor has completed its burn and the spacecraft is in its transfer orbit, the explosive bolts 27 on the clamping ring 26 are fired releasing the separation rings (not shown) between the spacecraft 13 and the adapter 3. At this point, springs 26a withdraw the clamping ring sections from the separation rings. Separation springs which are conventionally axially disposed between the adapter 3 and the spacecraft 13 affect axial separation.

In applications to three axes systems the initial spin of the three axes spacecraft provided by the canted springs 17 provides angular momentum in a degree sufficient to provide stabilized deployment.

Although this invention has been illustrated and described utilizing a structural organization, adapted for launching the payload from the space shuttle, it will be apparent to those skilled in the art that the invention is not limited to space shuttle launching. For instance, minor revisions in the configuration of the illustrated cradle removing or shortening the cradle arms reduces the size of the cradle so that it may be fitted along with the spacecraft mounted thereon into the nose cone of an expendable type of launch vehicle, such as those in the Delta class of the Atlas Centaur class.

In such expendable type of vehicle launch applications, the cradle may be a separate add on structure, such as that disclosed, or, it may be built in as a permanent part of the launch vehicle structure adjacent the nose cone. More or fewer canted launching springs may be used as dictated by design constraints. Attachments other than the separation ring attachments described may be employed to secure the payload to the support structure or payload carrier of the launch vehicle. For example, if four springs are used between the payload and the launch vehicle, explosive bolts may be used at each spring tie down point and fired simultaneously to release the payload. Other modifications which fall within the spirit and scope of this invention will be apparent to those skilled in the art.

What is claimed is:

1. Apparatus for the gyroscopic ejection of a payload from a payload carrier comprising:

a payload carrier;

a payload mounted on said payload carrier;

means releasably securing said payload to said payload carrier;

at least two compression springs compressed between said payload carrier and said payload in positions tilted from the perpendicular on opposite sides of said payload, to apply tangential components of spring compression force in the same rotational direction to said payload and components of spring compression thrust to said payload in the same direction parallel to the rotation axis of said payload; and means supporting the ends of each of said springs to permit tilting of said springs to second angular positions when said payload is ejected;

whereby said springs are held in compression by said payload and when said means releasably securing said payload to said support structure releases said payload, said payload is rotated and ejected by said springs from said payload carrier.

2. Apparatus for the gyroscopic ejection of a payload from a launch vehicle comprising:

a support structure adapted for mounting in said launch vehicle and having payload mounting means thereon;

a payload having mounting seat means thereon disposed on said payload mounting means of said support structure;

means releasably securing said payload to said support structure;

a plurality of springs compressed in uniformly tilted first angular positions between said support structure and said payload, to apply tangential components of spring compression force to said payload in the same rotational direction and components of spring compression thrust to said payload in the same direction parallel to the rotation axis of said payload; and means supporting the ends of each of said springs to permit tilting of said springs to second angular position when said payload is ejected;

whereby said springs are held in compressed tilted positions by said payload and when said means releasably securing said payload to said support structure releases said payload, said payload is rotated and ejected by said springs from said support structure.

3. Apparatus as set forth in claim 2, in which, said payload is a spacecraft having a central axis substantially intersecting the center of mass of said spacecraft and said springs apply torque about said central axis while ejecting said spacecraft in a direction longitudinally of said central axis.

4. Apparatus as set forth in claim 3, in which, said spacecraft is a three-axis stabilized spacecraft.

5. Apparatus as set forth in claim 3, in which, said spacecraft is a spin stabilized spacecraft.

6. Apparatus as set forth in claim 3, in which, said springs are uniformly circumferentially distributed with respect to said central axis.

7. Apparatus as set forth in claim 2 in which said means supporting the ends of each of said springs comprises a pivotally mounted spring seat for each end of each spring of said plurality of springs permitting each spring seat to rotate and providing two degrees of angular freedom for the plane of each spring seat.

8. Apparatus as set forth in claim 2, in which said mounting seat means comprises an adapter secured to said payload and terminating in a circular seat;

means on said payload mounting means providing a complementary circular seat engaging said circular seat of said adapter; and said means supporting the ends of each of said springs pivotally supports said springs in correspondingly tilted positions in compression in uniformly spaced circumferential positions with respect to both of said circular seats.

9. Apparatus as set forth in claims 1 or 2 in which said means supporting the ends of each of said springs comprises ball and socket spring mounts at each end of each spring.

10. Apparatus as set forth in claim 1 in which said means supporting the ends of each of said springs comprises ball and socket spring mounts at each end of each spring; and
 a support section on each ball and socket spring mount at the end of each spring adjacent said payload carrier securing each of such ball and socket spring mounts to said payload carrier.

11. Apparatus as set forth in claim 2 in which said means supporting the ends of each of said springs comprises ball and socket spring mounts at each end of each spring; and
 a support section on each ball and socket spring mount at the end of each spring adjacent said support structure securing each of such ball and socket spring mounts to said support structure.

* * * * *